United States Patent [19] [11] 4,034,461
Lauterbach [45] July 12, 1977

[54] METHOD OF PROVIDING EXPANSION SHIMS FOR HOT BRIQUETTE SEGMENTED ROLLS

[75] Inventor: William L. Lauterbach, Upper St. Clair Township, Allegheny County, Pa.

[73] Assignee: United States Steel Corporation, Pittsburgh, Pa.

[21] Appl. No.: 699,741

[22] Filed: June 24, 1976

Related U.S. Application Data

[62] Division of Ser. No. 602,151, Aug. 6, 1975, Pat. No. 3,989,441, which is a division of Ser. No. 409,833, Oct. 26, 1973, Pat. No. 3,938,930.

[51] Int. Cl.[2] .......... B23P 19/00
[52] U.S. Cl. .......... 29/428; 29/148.4 D; 29/423
[58] Field of Search ..... 29/423, 124, 428, 148.4 D; 425/194, 271, 272; 308/244

[56] References Cited

U.S. PATENT DOCUMENTS

| | | | |
|---|---|---|---|
| 973,380 | 10/1910 | Parker | 29/148.4 D X |
| 1,748,212 | 2/1930 | Derby | 308/244 |
| 1,954,635 | 4/1934 | Leonard | 425/194 |
| 1,981,500 | 11/1934 | Frelin | 308/244 X |
| 2,613,571 | 10/1952 | Herman | 308/244 X |
| 2,803,040 | 8/1957 | Robert et al. | 425/194 |
| 3,419,951 | 1/1969 | Carlson | 29/423 X |
| 3,760,477 | 9/1973 | Koch | 425/194 X |

*Primary Examiner*—Charlie T. Moon
*Attorney, Agent, or Firm*—William L. Krayer

[57] ABSTRACT

A shim designed for insertion between mold segments on hot briquette rolls permits accurate alignment of the segments and at the same time, by virtue of its softening and melting temperatures permits uniform expansion of the segments on heating.

2 Claims, 5 Drawing Figures

METHOD OF PROVIDING EXPANSION SHIMS FOR HOT BRIQUETTE SEGMENTED ROLLS

This is a division of application Ser. No. 602,151, Aug. 6, 1975, now U.S. Pat. No. 3,989,441, which is a division of application Ser. No. 409,833, filed Oct. 26, 1973, now U.S. Pat. No. 3,938,930.

BACKGROUND OF THE INVENTION

This invention relates to methods and devices for improving the performance of hot briquette rolls of the type used for highly reduced iron ore. In particular, the invention is an improvement in hot briquetting machines such as disclosed by Komarek in U.S. Pat. Nos. 3,077,634, 3,269,611, and 3,143,769.

The difficulty in operating hot segmented roll briquette machines has been that the segments must be inserted when they are cold and, of course, relatively contracted. At operating temperatures, i.e., in the range of 900° F, they are fully expanded. The difference in size may be expected to be about 0.03 inch. To achieve uniformity in the hot position of the rolls, they must be spaced with from 0.01 to 0.02 inch between them; the lower portions may be slightly closer together than the outer portions, depending on the shape of the mold segment. Frequently, the abutting mold segments each contain half a mold face, so that a complete briquette is formed half in one and half in the other. In this case, care must be taken that all segments, when they are expanded by the heat, meet precisely so no briquette material will enter the space between mold segments, and form a briquette having a raised portion in the center. Such a seam in the briquette is likely to stick in the mold and render the briquette difficult to dislodge. Uneven briquettes generally are more likely to have weak spots than symmetrical ones.

I am not aware of the use of low-melting alloys as sacrificial shims in the prior art.

SUMMARY OF THE INVENTION

My invention solves the problems of aligning the mold segments of a hot roll briquetting machine. A shim having a relatively low melting temperature, i.e., 550° F to 700° F, inserted in the expansion gap between mold segments will insure the uniform placement and expansion movement of mold segments and at the same time prevent the deposition of briquette material in the expansion gap.

Figure 1:
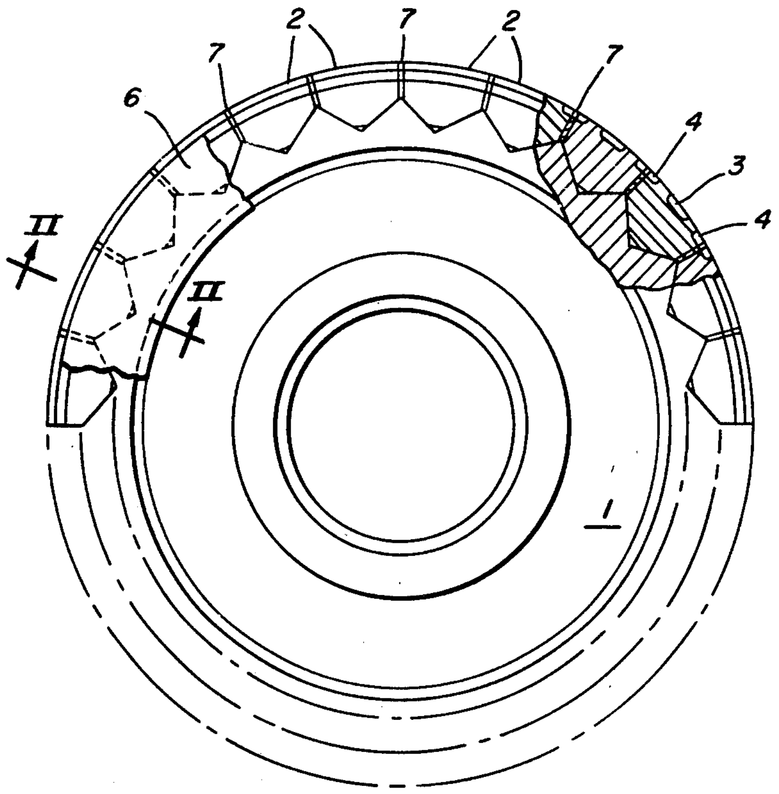
Figure 2:
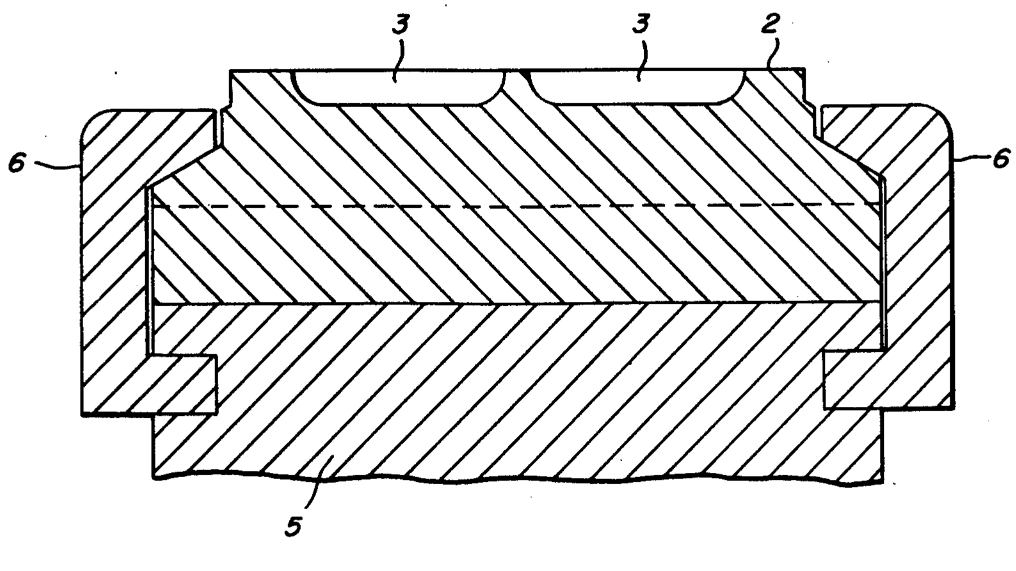
Figure 3:
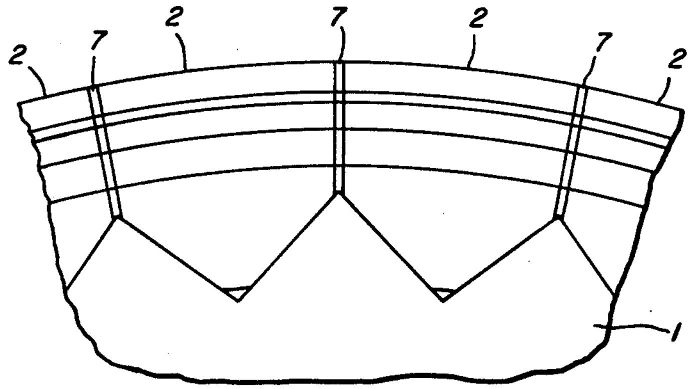
Figure 4:
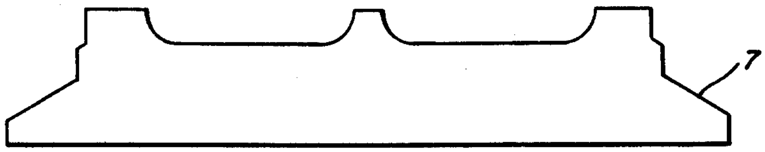
Figure 5:
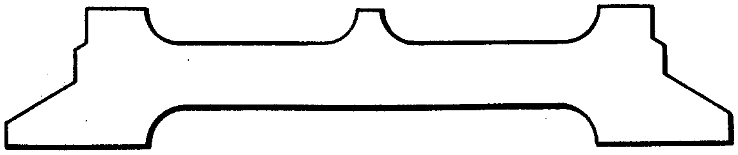

My invention will be further described with reference to the accompanying drawings in which FIG. 1 is more or less diagrammatic side sectional view of a briquette roll, FIG. 2 is a sectional view of a roll segment positioned on the roll, FIG. 3 is a side view of two segments showing the conventional expansion gap and FIGS. 4 and 5 are profiles of preferred forms of my shim for insertion in the expansion gap.

In FIG. 1, the main body or roll core 1 of the briquette roll is a simplified depiction of a roll of the type described in more detail in U.S. Pat. No. 3,077,364. It is adapted to compress reduced iron ore or other hot, powdered material together with another tangentially placed roll while the hot powdered material is fed between them from above. The roll segments 2 in this illustration each have one whole pocket contour 3 and two half-pocket contours 4, although it is also common to have two whole pockets and two half-pockets.

Referring to FIG. 2, the roll segments 2 typically have more than one pocket 3 in side-by-side relationship. The roll segment 2 is held in place on the roll core 5 by segment clamps 6.

In FIG. 3, the expansion gap 7 is illustrated between two roll segments 2. FIG. 4 is the profile of a preferred form of a shim designed to fill the expansion gap of a machine in which the roll segments contain two side-by-side pockets. FIG. 5 is a similar shim with a portion cut away.

Placed between the segments when the roll is "down", or cold, the shim will enable the operator to adjust all segments with a minimum of difficulty. After the machine resumes operation, the shim will soften and yield when pressures are exerted on it by the expanding segments. When the segments reach peak temperature, the shim will be completely melted and dissipated, and the mold segments will achieve firm and uniform contact throughout.

For molds made of tool steel, achieving temperatures as high as 1000° F, I prefer to use a shim made of silver solder and solders with relatively high melting temperatures (600° F. and above) but which become plastic at about 350° F. The shim should not become completely fluid until the maximum expansion is achieved or nearly achieved.

The shim need not have a profile identical to that of the edge of the roll segment, but such a profile is preferred in order to achieve the most efficient use of the alloy, which, of course, is lost after it melts. The shim should substantially fill the expansion gap; otherwise significant amounts of briquette material may enter. It may be found desirable in certain instances to employ a shim of which a portion has been cut away as in FIG. 5.

The shims should be inserted in all the expansion gaps for best results.

I claim:

1. Method of aligning mold segments on a hot roll briquette machine comprising assembling said mold segments in circumferentially spaced condition on a hot briquette roll with expansion gaps therebetween, and inserting shims in the expansion gaps thereof, said shims having melting points no higher than the temperature at which the mold segments achieve their greatest expansion under operating conditions.

2. Method of claim 1 wherein the melting point of the shims is between about 550° F and 700° F.

* * * * *